US008019785B2

(12) United States Patent
Moir et al.

(10) Patent No.: US 8,019,785 B2
(45) Date of Patent: Sep. 13, 2011

(54) SPACE-AND TIME-ADAPTIVE NONBLOCKING ALGORITHMS

(75) Inventors: Mark S. Moir, Windham, NH (US); Victor M. Luchangco, Cambridge, MA (US); Maurice Herlihy, Brookline, MA (US)

(73) Assignee: Oracle America, Inc., Redwood City, CA (US)

( * ) Notice: Subject to any disclaimer, the term of this patent is extended or adjusted under 35 U.S.C. 154(b) by 574 days.

(21) Appl. No.: 12/130,635

(22) Filed: May 30, 2008

(65) Prior Publication Data

US 2008/0229139 A1     Sep. 18, 2008

Related U.S. Application Data

(62) Division of application No. 10/621,078, filed on Jul. 16, 2003, now Pat. No. 7,395,274.

(60) Provisional application No. 60/396,152, filed on Jul. 16, 2002.

(51) Int. Cl.
*G06F 7/00* (2006.01)

(52) U.S. Cl. ......... 707/796; 707/813; 707/814; 707/820

(58) Field of Classification Search ........... 707/999.206, 707/689, 796, 813, 814, 820
See application file for complete search history.

(56) References Cited

U.S. PATENT DOCUMENTS

| | | | |
|---|---|---|---|
| 4,584,640 A | 4/1986 | MacGregor et al. | |
| 4,847,754 A | 7/1989 | Obermarck et al. | |
| 5,081,572 A | 1/1992 | Arnold | |
| 5,222,238 A | 6/1993 | Zobre et al. | |
| 5,224,215 A | 6/1993 | Disbrow | |
| 5,319,778 A | 6/1994 | Catino | |
| 5,428,761 A | 6/1995 | Herlihy et al. | |
| 6,128,710 A | 10/2000 | Greenspan et al. | |
| 6,144,965 A | 11/2000 | Oliver | |
| 6,178,423 B1 | 1/2001 | Douceur et al. | |
| 6,360,219 B1 | 3/2002 | Bretl et al. | |
| 6,360,220 B1 | 3/2002 | Forin | |

(Continued)

FOREIGN PATENT DOCUMENTS

EP     0 366 585     5/1990

(Continued)

OTHER PUBLICATIONS

Afek, Yehuda et al., "*Long-Lived Renaming Made Adaptive*", 18th Annual ACM Symposium on Principles of Distributed Computing, pp. 91-104, 1999.

(Continued)

*Primary Examiner* — Tim T. Vo
*Assistant Examiner* — Gary Koo
(74) *Attorney, Agent, or Firm* — Robert C. Kowert; Meyertons, Hood, Kivlin, Kowert & Goetzel, P.C.

(57) ABSTRACT

We explore techniques for designing nonblocking algorithms that do not require advance knowledge of the number of processes that participate, whose time complexity and space consumption both adapt to various measures, rather than being based on predefined worst-case scenarios, and that cannot be prevented from future memory reclamation by process failures. These techniques can be implemented using widely available hardware synchronization primitives. We present our techniques in the context of solutions to the well-known Collect problem. We also explain how our techniques can be exploited to achieve other results with similar properties; these include long-lived renaming and dynamic memory management for nonblocking data structures.

12 Claims, 3 Drawing Sheets

U.S. PATENT DOCUMENTS

| | | | |
|---|---|---|---|
| 6,366,932 | B1 | 4/2002 | Christenson |
| 6,581,063 | B1 | 6/2003 | Kirkman |
| 6,651,146 | B1 | 11/2003 | Srinivas et al. |
| 6,826,757 | B2 | 11/2004 | Steele, Jr. et al. |
| 6,993,770 | B1 * | 1/2006 | Detlefs et al. ............ 719/315 |
| 2001/0047361 | A1 | 11/2001 | Martin et al. |
| 2003/0140085 | A1 | 7/2003 | Moir et al. |
| 2003/0174572 | A1 | 9/2003 | Moir et al. |
| 2003/0182462 | A1 | 9/2003 | Moir et al. |
| 2003/0182465 | A1 | 9/2003 | Moir et al. |
| 2004/0015510 | A1 | 1/2004 | Moir et al. |
| 2004/0015642 | A1 | 1/2004 | Moir et al. |
| 2004/0034673 | A1 | 2/2004 | Moir et al. |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Afek, Yehuda, "*Wait-Free Made Fast*", 27th Annual ACM Symposium on Theory of Computing, pp. 538-547, 1995.

Agesen, Ole et al., "*DCAS-Based Concurrent Deques*", 12th Annual ACM Symposium on Parallel Algorithms and Architectures, pp. 137-146, Jul. 2000.

Anderson, James H. et al., "*Using Local-Spin k-Exclusion Algorithms to Improve Wait-Free Object Implementations*", 12th Annual ACM Symposium on Principles of Distributed Computing, Nov. 1995 (revised 1996, 1997).

Arora, Nimar S. et al., "*Thread Scheduling for Multiprogrammed Multiprocessors*", 10th Annual ACM Symposium on Parallel Algorithms and Architectures, pp. 119-129, 1998.

Attiya, Hagit et al., "*An Adaptive Collect Algorithm with Applications*", Dept. of Computing Science, The Technion, Israel, May 10, 2001.

Barnes, Greg, "*A Method for Implementing Lock-Free Shared Data Structures*", 5th Annual ACM Symposium on Parallel Algorithms and Architectures, pp. 261-270, 1993.

Bayer, R. et al., "*Concurrency of Operations on B-Trees*", Acta Informatica, 1977.

Detlefs, David L. et al., "*Even Better DCAS-Based Concurrent Deques*", 14th International Conference on Distributed Computing, pp. 59-73, 2000.

Detlefs, David L. et al., "*Lock-Free Reference Counting*", 20th Annual ACM Symposium on Principles of Distributed Computing, pp. 190-199, 2001.

Dice, David et al., "*Mostly Lock-Free Malloc*", ACM 2002.ACM SIGPLAN International Symposium on Memory Management, Jun. 2002.

Greenwald, Michael B., "*Non-Blocking Synchronization and System Design*", PhD Thesis, Stanford University Technical Report STAN-CS-TR-1624, Palo Alto, California, Aug. 1999.

Herlihy, Maurice, "*A Methodology for Implementing Highly Concurrent Data Objects*", ACM Transactions on Programming Languages and System, pp. 745-770, Nov. 1993.

Herlihy, Maurice, "*Dynamic-Sized Lockfree Data Structures*", Sun Microsystems Technical Report SMLI TR-2002-112, Jun. 2002.

Herlihy, Maurice et al., "*Linearizability: A Correctness Condition for Concurrent Objects*", ACM Transactions on Programming Languages and Systems, pp. 463-492, Jul. 1990.

Herlihy, Maurice et al., "*The Repeat Offender Problem: A Mechanism for Supporting Dynamic-Sized Lock-Free Data Structures*", Sun Microsystems Technical Report SMLI TR-2002-112, Jun. 2002.

Herlihy, Maurice et al., "*Transactional Memory: Architectural Support for Lock-Free Data Structures*", 20th International Symposium in Computer Architecture, 1993.

Herlihy, Maurice et al., "*Obstruction-Free Synchronization: Double-Ended Queues as an Example*", 23rd International Conference on Distributed Computing, May 2003.

Israeli, Amos et al., "*Disjoint-Access-Parallel Implementations of Strong Shared Memory Primitives*", 13th Annual ACM Symposium on Principles of Distributed Computing, pp. 1 51-160, 1994.

Lamport, Leslie, "*How to Make a Multiprocessor Computer that Correctly Executes Multiprocess Programs*", IEEE Transactions on Computers, Sep. 1979.

Luchangco, Victor et al., "*Nonblocking k-compare-single-swap*", 15th Annual ACM Symposium on Parallel Algorithms and Architectures, Jun. 2003.

Martin, Paul et al., "*DCAS-Based Concurrent Deques Supporting Bulk Allocation*", Sun Microsystems, Inc. Technical Report SMI TR-2002-111, Oct. 2002.

Michael, Maged M. et al., "*Non-Blocking Algorithms and Preemption-Safe Locking on Multiprogrammed Shared Memory Multiprocessors*", Journal of Parallel and Distributed Computing, Mar. 1997.

Michael, Maged M. et al., "*Simple, Fast and Practical Non-Blocking and Blocking Concurrent Queue Algorithms*", 15th Annual ACM Symposium on Principles of Distributed Computing, pp. 267-276, 1996.

Michael, Maged M., "*Safe Memory Reclamation for Dynamic Lock-Free Objects Using Atomic Reads and Writes*", 21st Annual ACM Symposium on Principles of Distributed Computing, pp. 21-30, Jan. 2002.

Moir, Mark, "*Laziness Pays! Using Lazy Synchronization Mechanisms to Improve Non-Blocking Constructions*", 19th Annual ACM Symposium on Principles of Distributed Computing, 2000.

Moir, Mark, "*Practical Implementations of Non-Blocking Synchronization Primitives*", 16th Annual ACM Symposium on Principles of Distributed Computing, 1997.

Moir, Mark, "*Transparent Support for Wait-Free Transactions*", 11th International Workshop on Distributed Algorithms, 1997.

Moir, Mark et al., " *Wait-Free Algorithms for Fast, Long-Lived Renaming*", Science of Computer Programming, Aug. 1994.

Saks, Michael et al., "*Optimal Time Randomized Consensus—Making Resilient Algorithms Fast in Practice*", 2nd ACM Siam Symposium on Discrete Algorithms, pp. 351-362, 1991.

Shavit, Nir et al., "*Software Transactional Memory*", Distributed Computing, Special Issue (10), 1997.

Trieber, R, "*Systems Programming. Coping with Parallelism*", IBM Technical Report RJ5118, Apr. 23, 1986.

Turek, John et al., "*Locking without Blocking: Making Lock Based Concurrent Data Structure Algorithms Nonblocking*", 11th ACM SIGACT-SIGMOD-SIGART Symposium on Principles of Database Systems, 1992.

Herlihy, M.P., "Wait-Free Synchronization," *ACM Transactions On Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps. gz].

Bershad, B. N., "Practical Considerations for Non-Blocking Concurrent Objects," *Proceedings 13th IEEE International Conference on Distributed Computing Systems*, pp. 264-273. IEEE Computer Society Press, Washington, D.C., 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization And Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Attiya, Hagit, et al., "Atomic Snapshots In O(n. log n) Operations," *SIAM Journal on Computing*, 27(2):319-340, Apr. 1998.

Agesen, Ole at el., "An Efficient Meta-Lock for Implementing Ubiquitous Synchronization," ACM SIGPLAN Notices, vol. 34, No. 10, pp. 207-222, Oct. 1999.

Anderson, James H. et al., "Universal Constructions for Large Objects," *IEEE Transactions on Parallel and Distributed Systems*, vol. 10, No. 12, pp. 1317-1332, 1999.

Farook, Mohammad et al., "Managing Long Linked Lists Using Lock Free Techniques" in *High Performance Computing Systems and Applications, Chapter 37* (pp. 407-422), Kluwer Academic Publishers, Oct. 1998.

Mellor-Crummey, J., et al., Algorithms for Scalable Synchronization on Shared-Memory Multiprocessors, *ACM Transactions on Computer Systems*, vol. 9, No. 1, pp. 21-65, Feb. 1991.

Prakash, Sundeep et al., "Non-Blocking Algorithms for Concurrent Data Structures," Technical Report 91-002, University of Florida, Jul. 1, 1991 [URL: http://citeseer.ist.psu.edu/prakash91nonblocking.html].

Prakash, Sundeep et al., "A Nonblocking Algorithm for Shared Queues Using Compare-and-Swap," *IEEE Transactions on Computers*, vol. 43, No. 5, pp. 548-559, May 1994.

Shann, Chien-Hua et al., "A Practical Nonblocking Queue Algorithm Using Compare-and Swap," *Proceedings of the Seventh International Conference on Parallel and Distributed Systems* p. 470, IEEE Computer Society, Washington, D.C., 2000.

Shavit, N., et al., "Elimination Trees and the Construction of Pools and Stacks," *Theory of Computing Systems*, vol. 30, pp. 645-670, 1997.

Stone, Janice M., "A simple and correct shared-queue algorithm using Compare-and-Swap," *Proceedings of the 1990 ACM/IEEE Conference on Supercomputing*, pp. 495-504, IEEE Computer Society, New York, NY, 1990.

Valois, John D., "Lock-Free Linked Lists Using Compare-and-Swap," *Proceedings of the Fourteenth ACM Symposium on Principles of Distributed Computing*, pp. 214-222, ACM Press, New York, NY 1995.

* cited by examiner

SPACE- AND TIME-ADAPTIVE NONBLOCKING ALGORITHMS

CROSS-REFERENCE TO RELATED APPLICATION(S)

This application is a divisional of U.S. application Ser. No. 10/621,078, filed Jul. 16, 2003, which claims priority, under 35 U.S.C. §119(e), of U.S. Provisional Application No. 60/396,152, filed 16 Jul. 2002, naming Mark Moir, Victor Luchangco and Maurice Herlihy as inventors.

BACKGROUND

1. Field of the Invention

The present invention relates generally to coordination amongst execution sequences in a multiprocessor computer, and more particularly, to structures and techniques for facilitating non-blocking implementations of dynamically sizable shared data structures.

2. Description of the Related Art

Most existing nonblocking algorithms (including lock-free and wait-free algorithms) require a priori knowledge of N, the number of processes (or threads) that will potentially participate. Many such algorithms also have space consumption and/or time complexity that depend on N, and will behave incorrectly if N is underestimated. In practice, this dependence results in overly conservative estimates of N and, as a result, in wasted time and space. Some researchers have addressed the time complexity part of this problem by designing algorithms whose time complexity "adapts" to the number of processes that actually participate. See e.g., M. Moir and J. Anderson, *Wait-Free Algorithms for Fast, Long-Lived Renaming*, Science of Computer Programming, 25:1-39 (1995); Y. Afek, D. Dauber, and D. Touitou, *Waitfree Made Fast*, In Proceedings of the 27th Annual ACM Symposium on Theory of Computing, pp. 538-547 (1995); and Y. Afek, H. Attiya, A. Fouren, G. Stupp, and D. Touitou, *Long-lived Renaming Made Adaptive*, In Proceedings of the 18th Annual ACM Symposium on Principles of Distributed Computing, pp. 91-104 (1999).

As discussed in more detail later, most of these research efforts have been based on the assumption that only read and write operations are available, which is not true in modern shared-memory multiprocessors. This restriction has led to algorithms that are ingenious and beautiful—but ultimately impractical. It has, in our view, also prevented the work from addressing either the space overhead problem or the need for a known bound on the number of processes that potentially participate.

Other results (see e.g., M. Michael and M. Scott, *Simple, Fast, and Practical Non-Blocking and Blocking Concurrent Queue Algorithms*, In Proceedings of the 15th Annual ACM Symposium on the Principles of Distributed Computing, pp. 267-276 (1996)) do not require knowledge of N, and can allocate space dynamically as required, but cannot reclaim space after it has been used. To our knowledge, the only algorithm that does not exhibit the aforementioned shortcomings is Treiber's link-list-based set data structure. See R. Treiber, *Systems Programming: Coping with Parallelism*, Technical Report RJ5118, IBM Almaden Research Center (1986). Unfortunately, Treiber's techniques can be prevented from future memory reclamation by a single process failure.

What is needed is structures and techniques that facilitate the design of nonblocking algorithmns that do not require advance knowledge of the number of processes that participate, whose time complexity and space consumption are both adaptive and which are not prevented from future memory reclamation should a single process (or thread) fail.

SUMMARY

We have developed techniques that can be used to address all (or some) of these problems in a variety of important contexts. That is to say, we have developed nonblocking algorithms that do not require advance knowledge of the number of processes that participate, whose time complexity and space consumption are both adaptive and which are not prevented from future memory reclamation should a single process (or thread) fail. We demonstrate our techniques with implementations that employ a compare-and-swap (CAS) synchronization primitive, which is widely available in modem shared-memory multiprocessors. While use of a CAS primitive, rather than more exotic synchronization, is desirable, persons of ordinary skill in the art will recognize (based on the description herein) variations that employ other single-target synchronization primitives, or for that matter, multi-target constructs. We present our techniques in the context of solutions to the well-known Collect problem, which is a building block in solutions to various problems in concurrent computing, and which therefore establishes a wide range of potential exploitations for our techniques. We also explain how our techniques can be applied to achieve solutions to other problems, which demonstrate that our solutions overcome some of the shortcomings recognized or inherent in previous solutions. Examples include renaming and dynamic memory management in nonblocking implementations of dynamic-sized data structures. These and other exploitations of the invented structures and techniques will be understood with reference to the description and claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
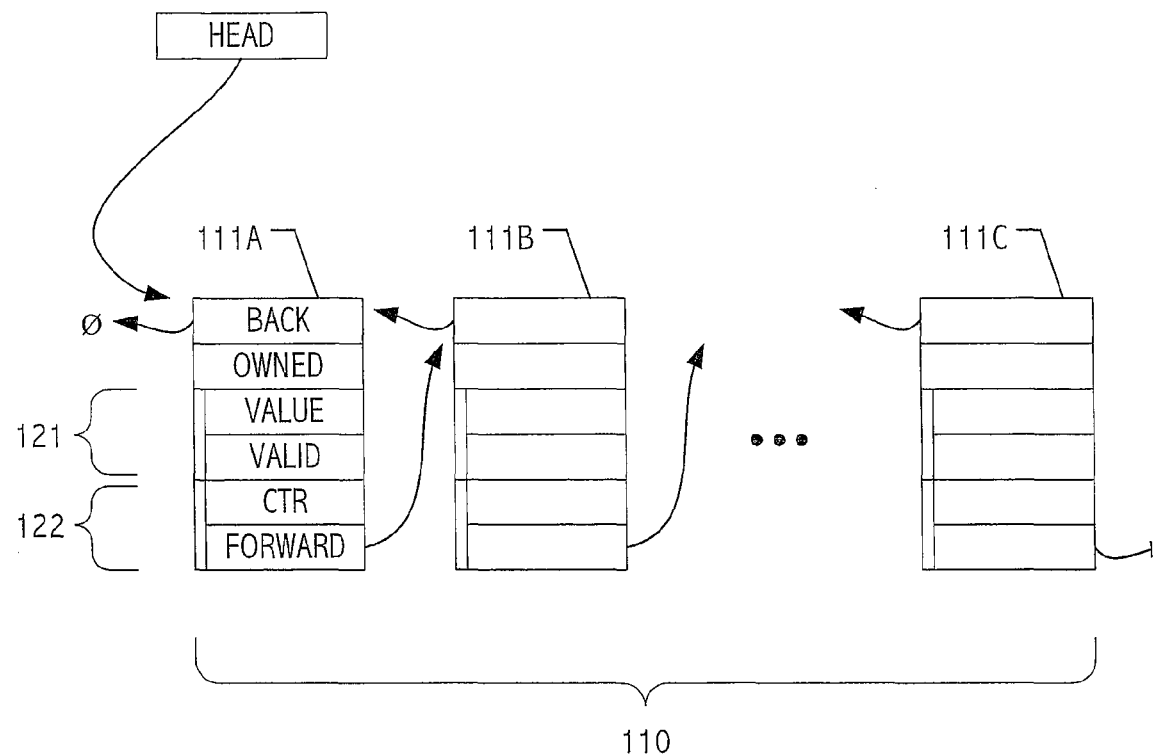
FIG. 1 depicts a doubly-linked list structure consistent with an exemplary Collect implementation in accordance with some embodiments of the present invention.

There are various properties that can be used to characterize algorithms with respect to their time complexity, space requirements, and parameters required to be known in advance. Below, we describe other work that has led to the identification or definition of some of these properties, and also introduce some new properties. While much of the work summarized below may itself represent the state of art, we wish to emphasize that (1) our analysis and recognition of limitations or shortcomings therein as well as (2) our identification of aspects of our own techniques or those developed by others that contribute to useful solutions are not prior art and are not admitted as such. Therefore, subject to the foregoing, we now summarize and synthesize certain other work (including our own) in the areas of time-adaptive and space-adaptive nonblocking algorithms and properties.

Time Adaptivity Properties and Other Work

We begin by discussing the wait-free universal construction due to Herlihy. See M. Herlihy, *A Methodology for Implementing Highly Concurrent Data Objects*, ACM Transactions on Programming Languages and Systems, 15(5):745-770 (1993). In general, a wait-free universal construction takes sequential code for the operations of a shared object, and automatically produces a wait-free implementation of the equivalent object. Herlihy's construction requires a known bound N on the number of processes that will ever access the implemented data structure. We call such implementations population-aware, while implementations that do not require such a bound are population-oblivious. Herlihy's construction allocates space to accommodate all N processes, and the best-case time complexity of operations is dependent on N. Thus, it has all of the disadvantages discussed earlier.

Anderson and Moir have observed that Herlihy's construction plans for the worst case in which all N processes concurrently access the same data structure, and proposed an approach for reducing its overhead (both time and space). See J. Anderson and M. Moir, *Using Local-Spin K-Exclusion Algorithms to Improve Wait-Free Object Implementations*, Distributed Computing, 11: 1-20 (1997). The approach is to choose a k<N such that, typically, at most k processes will concurrently access the construction, and to use an instance of Herlihy's construction for k—rather than N—processes. To ensure that the construction does not behave incorrectly if k is underestimated, Anderson and Moir's approach protects the k-process implementation with a k-exclusion "wrapper." Performance experiments demonstrated that this approach does indeed improve the performance of Herlihy's construction if k is chosen appropriately. However, this approach has two disadvantages. First, if more than k processes concurrently access the construction, some processes have to wait, so the advantages of nonblocking implementations are lost if k is underestimated. Second, the choice of k must be made in advance. While this is not as severe as the need to know N, because a wrong choice affects only performance and not correctness, it is still an inconvenience because it may be difficult to estimate k correctly.

Afek, Dauber, and Touitou present universal constructions that overcome these problems, and which have time complexity that depends on actual contention (the number of processes concurrently accessing the construction), without the need to estimate a bound on contention in advance. See Y. Afek, D. Dauber, and D. Touitou, *Wait-free Made Fast*, In Proceedings of the 27th Annual ACM Symposium on Theory of Computing, pp. 538-547 (1995). However, their constructions still require advance knowledge of N for correctness, so N must be estimated conservatively and space consumption is dependent on N.

In some cases, it may be easy to provide a precise bound on the number of processes that will access an implementation. For example, an application may create a fixed number of processes, each of which will access the implementation. In other cases, the number of processes created may depend on the machine on which the application is run, application input, or asynchronous and unpredictable events. Even in cases where we can easily bound N—the number of processes that will ever access the implementation—it may be difficult to estimate the maximum contention (i.e., the number of processes that will concurrently access the implementation). Thus, implementations whose time complexity and space consumption adapt to the actual conditions in each execution—rather than being determined by a priori bounds on worst-case conditions—are preferable. Below we discuss more precisely what we mean by "actual conditions."

Other work in this area has focused on implementations whose time complexity adapts to contention. In this context, various definitions of the terms "contention" and "adapt" are useful for different purposes. For example, contention during a particular interval of time might mean the total number of distinct processes that are active during that interval, or it might mean the maximum number of distinct processes that are simultaneously active at any point in time during that interval. We call these cumulative and concurrent contention, respectively.

In general, adaptivity properties need to be expressed in terms of a variety of different "measures." As demonstrated by several examples herein, merely considering contention is not always sufficient. Furthermore, adaptivity properties are often expressed as functions of certain measures over certain intervals of time. The interval considered might be the execution interval of an operation (operation), or the interval starting from the beginning of the execution history up until the current time (historical), or some other interval. The choice of interval affects what it means for an implementation to adapt. For example, if an implementation guarantees that the time complexity of a particular operation is bounded by a function of the maximum number of operations simultaneously executing concurrently with it, and is independent of the number of processes that were active concurrently at any point before the operation began execution, then we would say that the operation implementation is time-adaptive to operation concurrent contention. Alternatively, if an implementation guarantees that the operation's time complexity is bounded by a function of the maximum number of processes executing concurrently at any point in the past, we would say that the operation implementation is time-adaptive to historical concurrent contention.

There has been considerable research in recent years on implementations that are time-adaptive for various definitions. Some pioneering efforts in this direction are the universal constructions of Afek, Dauber, and Touitou already mentioned, one-shot and long-lived renaming algorithms (see Anderson and Moir; Moir and Anderson; and Y. Afek, D. Dauber, and D. Touitou (cited above)), and Collect implementations. This work has resulted in algorithms that are time-adaptive under a variety of definitions. However, all of them are population-aware because space must be preallocated for the possibility that all N processes access the implementation concurrently. Space consumption for each of the read/write-based adaptive long-lived renaming and Collect algorithms is at least cubic in N, and in some cases is exponential in N or even unbounded. This space must be allocated in advance, so it is used even if actual contention is always very low (and results that use unbounded space are unimplementable).

Space Adaptivity Properties and Other Work

We present herein the first solutions to all of the problems mentioned above in which space consumption adapts to actual conditions, rather than worst-case conditions. A consequence is that we have achieved algorithms that are population-oblivious, a significant advantage.

Designing implementations whose space consumption adapts to actual conditions can introduce a significant additional challenge, depending on the chosen measure for "actual conditions." In particular, if this measure can decrease over time, the space consumption of the implementation must also decrease, i.e., memory must be freed. As an example, consider a FIFO queue implementation in which space consumption is required to be bounded by a function of the number of elements in the queue; if the queue grows large and then later shrinks, memory must be freed. As observed in some of our recent work on memory management for nonblocking implementations of shared data structures (see generally, commonly owned, co-pending U.S. patent application Ser. No. 10/340,156, filed Jan. 10, 2003, naming Mark S. Moir, Victor Luchangco and Maurice Herlihy as inventors), freeing memory in nonblocking implementations is challenging because it is difficult to ensure that another process will not access a memory block after it has been freed. Below we discuss nonblocking algorithms that are space adaptive, and also discuss various measures to which space consumption can be required to adapt.

Treiber (R. Treiber, *Systems Programming: Coping with Parallelism*, Technical Report RJ5118, IBM Almaden Research Center (1986)) presents a population-oblivious, lock-free implementation of a linked-list-based set data structure that can reclaim memory after use. However, the space consumption of this implementation can be caused to grow without bound, independent of historical measures, by a single failure or by continuous access. Treiber's implementation uses an atomic fetch-and-add instruction.

Michael and Scott present a population-oblivious, lock-free FIFO queue implementation that turns out to be space-adaptive to historical maximum queue size. See M. Michael and M. Scott, *Simple, Fast, and Practical Non-Blocking and Blocking Concurrent Queue Algorithms*, In Proceedings of the 15th Annual ACM Symposium on the Principles of Distributed Computing, pp. 267-276 (1996). To make our analysis more precise, let us define queue size at time t as the total number of enqueue operations that have ever been invoked before time t minus the number of deque operations that have returned a value other then "empty" before time t, and let us define the historical maximum queue size at time t as the maximum queue size at any time $t'<t$. Then the space consumption of Michael and Scott's queue implementation at time t is bounded by a function of historical maximum queue size. Although this algorithm eliminates the need to preallocate space for the maximum future queue size (and therefore does not need to estimate a bound on that maximum), it has the disadvantage that if the queue grows large and subsequently shrinks, the space no longer required cannot be reclaimed. This is because their implementation stores dequeued nodes in a pool (otherwise known as a freelist); nodes in the pool can be reused later by subsequent enqueue operations, but can never be freed because we can never be sure that they won't subsequently be accessed.

We recently presented a technique for lock-free memory management. See commonly owned, co-pending U.S. patent application Ser. No. 10/340,156, filed Jan. 10, 2003, naming Mark S. Moir, Victor Luchangco and Maurice Herlihy as inventors, which is incorporated herein by reference. In the incorporated patent application, we demonstrated how to use this technique to modify Michael and Scott's implementation so that a modified algorithm can free nodes from its pool. To summarize, in our approach, "guards" are "posted" on values to prevent them from being freed prematurely. Guards are implemented as preallocated arrays and it was important to know in advance the maximum total number of guards. We have developed techniques that allow us to remove this restriction from our approach, thereby making it population-oblivious. We elaborate herein.

Overview

We consider the well-known Collect problem, and present population-oblivious, nonblocking solutions that are adaptive in both time and space. In the Collect problem, processes can store values, and can "collect" a set of recently-stored values. These or similar operations are a common component in solutions to various problems in concurrent computing. The Collect problem is defined more precisely in the next section.

We present several Collect solutions with different adaptivity properties. We also explain how the same techniques can be used to achieve population-oblivious, time- and space-adaptive solutions to several other problems for which such solutions did not previously exist to our knowledge. These include renaming and memory management for dynamic-sized nonblocking data structures. In particular, these techniques can be used to make the results we presented in the above-incorporated, commonly owned, co-pending U.S. patent application Ser. No. 10/340,156, filed Jan. 10, 2003, naming Mark S. Moir, Victor Luchangco and Maurice Herlihy as inventors, population-oblivious and time- and- space-adaptive. Thus, we can achieve a version of Michael and Scott's lock-free FIFO queue that is population-oblivious and time-and space-adaptive. To our knowledge, this is the first such implementation of any dynamic-sized shared data structure that cannot be prevented from subsequent memory reclamation by process failures.

Our first Collect solution is extremely simple, but its space consumption depends on historical measures, which might be acceptable in some applications, but not in others. To overcome this shortcoming, we present another, somewhat more complicated implementation that removes the dependence on historical measures, but can be prevented for a long time from reclaiming space by continuous series of overlapping Collect operations. We also explain how to modify it to overcome this problem. All of these solutions are lock-free and are based on compare-and-swap (CAS), and can therefore be implemented in a wide variety of modern shared-memory multiprocessors. We also explain how our algorithms are wait-free under various assumptions. In some cases, the assumptions are rather exotic—but nonetheless implementable—hardware instructions.

Preliminaries

Below we formally define the Collect problem. Our definition generally follows conventional definitions, but is modified to allow the possibility of a single process storing different values at different dynamically allocated addresses. Roughly speaking, in the conventional formulation, each process can Store a value in its location, and processes can Collect a set of up-to-date values from all processes that have stored values. Our formulation generalizes this conventional formulation to allow processes to have multiple values stored in multiple locations at a time, and also to release those locations when they are no longer required so that the memory used for them can be reclaimed (or subsequently reused by another process). We call our more general problem the Dynamic Collect problem; however, for brevity we call it the Collect problem. We do not discuss the conventional Collect formulation further herein.

The Collect Problem

A solution to the Collect problem is an implementation of a Collect object, which is defined as follows using two datatypes, address and value. A Collect object supports the following operations:

Register( ): returns an address
Store(a,v): stores value v at address a
Deregister(a): deregisters address a
Collect( ): returns a set of (address,value) pairs We say that an address a is registered to a process p when it is returned by an invocation of Register by p, and that it is deregistered when Deregister(a) is invoked. A process may invoke Store and Deregister only with an address that has previously been registered to it, and which has not since been deregistered. Any process may invoke Collect at any time. A process may invoke Register multiple times without deregistering addresses previously registered to it. Register returns an address that has either never been registered, or has been deregistered since the previous time it was registered.

Following standard definitions, we say that if the first event of an operation op0 occurs after the last event of another operation op1, then op0 follows op1 and op1 precedes op0.

A Collect operation cop returns a set S of values such that the following conditions hold:

For an address a, if there does not exist a value w such that (a, w) ∈ S, then either there does not exist a Store(a, v) operation sop for any v such that sop precedes cop, or there exists a Deregister(a) operation dop that does not follow cop such that there is no Store(a, v) operation sop2 for any value v such that dop precedes sop2 and sop2 precedes cop.

For an address a and a value v, if (a, v) ∈ S, then there exists a Store(a, v) operation sop that does not follow cop such that there does not exist an operation op1 that is either a Store(a, w) operation for some w≠v or a Deregister(a) operation, such that sop precedes op1 and op1 precedes cop.

The above definition is weak in that it does not require Store operations to be atomic. For example, it does not preclude the possibility that a Collect operation that "sees" the value of a concurrent Store operation precedes another Collect operation that does not see it. It turns out that our algorithms do implement atomic Store operations. To be more precise, each Store operation in these implementations can be viewed as if it were a single event that occurs sometime between its first and last events (inclusive).

Algorithms

In this section, we present two Collect algorithms that are population-oblivious and are adaptive in both time and space. To more precisely state the adaptivity properties, we define the activity level at time t to be the sum of the number of addresses registered at time t and the number of processes either registering or deregistering an address at time t. Our first algorithm is very simple, and supports constant-time Store and Deregister operations and a Register operation whose time complexity adapts to the maximum activity level experienced during that operation. However, in this algorithm, both the time complexity of the Collect operation and space consumption adapt only to the historical maximum activity level; that is, this algorithm cannot free memory that is no longer required.

Our second algorithm also supports a constant-time Store operation and a Register operation whose time complexity adapts to the maximum activity level experienced during that operation. In this second algorithm, the time complexity of the Deregister operation is bounded by the maximum activity level during the Register operation that registered the address being deregistered. This algorithm can free memory, even after process failures, but can be prevented from freeing memory by a continuous series of overlapping Collect operations. Also the time complexity of the Collect operation is proportional the memory consumption, so these concurrent Collect operations also keep their own time complexity high in this scenario. Finally, we explain how to modify the second algorithm so that it does not have this problem. We state the properties of the modified algorithm more precisely later.

Each of our algorithms maintains a linked list of nodes that store values. When the activity level exceeds the number of nodes in the list, they can allocate and append new nodes to the end of the linked list. Nodes representing addresses that have been deregistered may be reused and returned in response to later registrations. We present and discuss each of these algorithms in detail in the rest of this section.

Algorithm 1: Space Adaptivity to Historical Activity Level

Our first algorithm maintains a singly linked list of nodes, each of which represents an address that a process can register. The datatypes used in Algorithm 1 are illustrated below.

```
Valtype = record                // stored together in atomically
                                // storable location
    valuetype value;            // valuetype is whatever type
                                // Store stores
    bool valid;
end;
nodetype = record
    bool owned;
    valtype val;
    nodetype *next;
end;
```

The code (which follows) assumes there is one node that is initially allocated and set to (false, (?, false), null), where ? indicates that any value is acceptable. The address of this node is known to all processes. Call it Head.

```
nodetype *Register( ) {
    nodetype *next;
    nodetype *newnode = new nodetype;    // Allocate new node
                                         // just in case
    newnode->owned = true; // It's mine, all mine...
    newnode->val = (?,false);    // Not a stored value;
                                 // ?=don't care
    newnode->next = null; // Terminate node
    nd = Head; // Start with first node
    while (true) {
        if (CAS(nd->owned,false,true)) {    // Try to
                                            // claim node
            delete newnode; // Didn't use newnode
            return nd; // Success; node claimed
        }
        if (nd->next == null) // No more nodes
            if (CAS(&nd->next,null,newnode)) // Try to
                                             // install one
                return newnode; // Success; return node
        nd = nd->next;    // If previous CAS failed, someone
                          // else added a new node; go to it
    }
}
Store(nd,v) {
    nd->val = (v,true);    // just store value
                           // with valid indicator
}
Deregister (nd) {
    nd->val = (?,false);    // so value won't get
                            // returned later
    nd->owned = false;    // give up ownership
}
set of values Collect( ) {
    S = emptyset; // see no values so far
    nd = Head; // start at first node
    while (nd) { // search through all nodes
        v = nd->val; // get value
        if (v.valid) // if it's a valid value,
            S = S union {(nd,v.value)}; // add it to the set
        nd = nd->next; // get next (if any)
    }
    return S; // return set of value collected
}
```

Each node has a flag owned that indicates whether it is registered to some To register, a process p walks down the list attempting to claim an unowned y changing its owned flag from false to true). If it successfully claims such a hen it returns that node as the result of the registration. If p reaches the end of without successfully claiming any node, then it attempts to add a new node he owned bit already set to true) to the end of the list. If successful, p returns w node. Otherwise, the list has been extended by some other process, so p continues down the list, attempting to claim an unowned node. To ensure that nodes are not claimed by multiple processes, and that new nodes are added successfully to the end of a list before they are returned, an atomic CAS operations is used to claim and to install nodes. To prevent Collect operations from returning values from nodes that have not yet had a value stored in them, or that have been deregistered, the value field of each node contains a valid flag that is initialized to false before the node is linked into the list, and is reset to false when the node is deregistered. Store operations atomically set this bit to true when writing their values. It is straightforward, e.g., by appropriate ordering, to separate these stores if necessary to allow stored values to take up an entire atomically-storable location.

The Collect operation walks down the list adding the valid (node, value) pairs it encounters as it does. The Deregister operation sets the valid bit of the node being deregistered to false, as explained above, and then sets the owner flag to false, so that the node may be claimed by future Register operations. The Store and Deregister operations do not need to be implemented with CAS because no other process will concurrently write the node accessed by these operations. Recall that a process may only execute the Store and Deregister operations on an address that has previously been registered to it and not since deregistered.

We can show that at some point in the execution of a Register operation that returns the kth node, the activity level is at least k. Because a Register operation always returns a node if it adds that node to the list, this property implies that a new node is added to the list only if the activity level is greater than the number of nodes in the list. However, because nodes are never removed from the list, the list does not shrink when the activity level decreases. Thus, the space consumption of this algorithm adapts to the historical maximum activity level.

The Store and Deregister operations both take constant time (and use only store instructions). The Register operation takes time proportional to the number of nodes it checks to see if they are claimed, which, by the property discussed above, is bounded by a function of the maximum activity level at any time during the execution of the Register operation. The Collect operation reads every node in the list, so it takes time proportional to the length of the list, which is bounded by a function of the historical maximum activity level.
Algorithm 2: Space Adaptivity to Operation Interval Measures Our second algorithm improves on the first one by allowing nodes to be removed from the list and freed. Thus, unlike the first algorithm, the space consumption of the Collect object in this algorithm, and the time complexity of the Collect operation, can decrease when the activity level decreases. To avoid memory access faults, before a process may free a node, it must ensure that no other process will subsequently access that node. To do this, we use "hold counts," as explained below.

The algorithm is based on doubly linked lists. As before, a process registers by finding and claiming a node in the list; if it reaches the end of the list without success, it extends the list with a newly allocated node; a back pointer is stored in the node before it is added to the end of the list, so the list is always doubly linked. To facilitate the reclamation of nodes, we augment each forward pointer in the linked list with a counter, which we call the hold count. This counter is read and updated atomically with the pointer. Specifically, when a process executing either Register or Collect reads a pointer while walking down the list, it also increments that pointer's associated counter. Also, when a Collect operation has reached the end of the list, it follows the back pointers in the list and decrements each of the counters it incremented while walking down the list. Similarly, a Deregister operation walks back to the beginning of the list from the node it is deregistering, decrementing each counter that the corresponding Register operation previously incremented. Thus, the counter in the forward pointer of a node records the sum of the number of nodes registered in the tail of the list starting from that pointer, plus the number of processes that are seeking or accessing nodes in that tail. Therefore, if a hold count goes to zero, no processes are accessing nodes in the tail of the list from that point, and no nodes in the tail are registered. Thus, the nodes in the tail of the list can be freed. In the simple algorithm we present to demonstrate this technique, we free nodes whenever possible; it would be easy to implement less aggressive policies to avoid prematurely freeing nodes if there is reason to believe they will be needed again soon.

As with Algorithm 1, if a Register operation returns the kth node, then at some point during its execution, the activity level is at least k. Thus, the list grows only when the activity level is greater than the number of nodes in the list during some Register operation, and the space consumption is bounded by the historical maximum activity level. In addition, unlike Algorithm 1, the space consumption may decrease if the activity level decreases. However, as we discuss later, this is guaranteed only if there is a point of low activity at which no Collect operations are executing. At the end of this section, we describe how to modify this algorithm to achieve a stronger guarantee.

To describe this algorithm, we use two operations, BumpUpOrInstall and BumpDownOrRemove, to atomically update a forward pointer and its associated hold count. These operations are both simple read-modify-write operations that could be implemented as atomic instructions in hardware. Semantics of these operations will be understood as follows:

```
ptrctr = record
    int ctr;
    nodetype *ptr;
end
nodetype *BumpUpOrInstall (ptrctr *fwd, ptrctr newifnull) {
    atomically {
        if (fwd->ptr == null)
            *fwd = newifnull; // value supplied for this case
        else
            *fwd = (fwd->ctr+1, fwd->ptr);    // just bump up
                                              // counter
        return fwd->ptr;
    }
}
nodetype *BumpDownOrRemove (ptrctr *fwd) {
    nodetype *removed;
    atomically {
        if (fwd->ptr == null) // no later nodes
            return null;      // don't change anything,
                              // just return
        if (fwd->ctr == 1) {      // I'm last one accessing
                                  // from here
            removed = fwd->ptr;   // remember node being
                                  // removed
            *fwd = (0,null);      // remove node
            return removed;       // return removed node
        }
        *fwd = (fwd->ctr-1, fwd->ptr);    // otherwise,
                                          // decrement count
        return null; // no node removed
    }
}
```

We present our algorithms in terms of these atomic operations not because we expect or recommend that they will appear in real hardware, but to help guide any work on impossibility results that aim to address what wait-free mechanisms are possible for dynamic-sized data structures. In practice, these operations can be implemented in a lock-free manner using standard hardware synchronization support such as CAS; we present simple CAS-based lock-free implementations next.

```
nodetype *BumpUpOrInstall (ptrctr *fwd,
                           ptrctr newifnull) {
    ptrctr of, nf;
    while (true) {
        of = *fwd; // Read current value
        if (of.ptr == null)      // if it's null,
                                 // prepare to install ...
            nf = newifnull;      // ... value supplied
                                 // for this case
        else
            nf = (of.ctr+1, of.ptr);   // else prepare to
                                       // bump up counter
        if (CAS (fwd,of,nf)) // try to install new value
            return newfwd.ptr;    // return installed value
                                  // if successful
    }
}
nodetype * BumpDownOrRemove (ptrctr * fwd) {
    ptrctr of;
    while (true) {
        of = *fwd; // read forward pointer and counter
        if (of.ptr == null)   // at the end of list
            return null;      // just return null
                              //(serialize at read)
        if (of.ctr == 1)      // if I'm the last one
// accessing from here
            if (CAS(fwd,of,(0,null))) // try to remove node
                return of.ptr; // return removed node
        else
            if (CAS(fwd,of,(of.ctr-1,of.ptr)));
            // otherwise, try to decrement count
                return null; // no node removed
    }
}
```

The datatypes used by Algorithm 2 are as follows:

```
ptrctr = record
    int ctr;
    nodetype *ptr;
end
valtype = record   // stored together in
                   // atomically-storable location
    valuetype value;   // valuetype is whatever
                       // type Store stores
    bool valid;
end;
nodetype = record
    nodetype *back;
    bool owned;
    valtype val;
    ptrctr forward;
end
```

FIG. 1 illustrates a doubly-linked structure 110 with nodes 111A, 111B ... 111C in accordance with the above datatypes. Note that ptrctr record 122 (which encodes both the hold count, ctr, and the forward pointer, ptr) is encoded in an atomically storable location to allow synchronization of operations that add and remove nodes from the list and to facilitate tracking of a total count of operations that concurrently operate on nodes beyond the encoded <hold count, pointer>. A back pointer identifies predecessor nodes. Operations on the illustrated structure will be understood with reference to the following code.

```
nodetype *Register( ) {
    nodetype *newnode = new nodetype;   // Allocate new node
                                        // just in case
    newnode->owned = true; // It's mine, all mine...
    newnode->val = (?,false);   // Not a stored value;
                                // ?=don't care
    newnode->forward = (0,null); // Terminate node
    nd = Head;
    while (true) {
        if (CAS(&nd->owned, false, true)) {   // Try to claim
                                              // this node
            delete newnode; // Didn't use it
            return nd; // Return it if successful
        }
        newnode->back = nd;   // Set up back pointer
        next = BumpUpOrInstall(&nd->forward,(1,newnode));
        // Move to next and bump up counter, or
        // install new node if there's none.
        if (next == newnode) // I installed my node;
            return newnode; // return it
        nd = next; // Move on to next node
    }
}
Store(nd,v) {
    nd->val = (v,true);   // just store value with
                          // valid indicator
}
Deregister(nd) {
    nd->val = (?,false); // so value won't get
                         // returned later
    nd->owned = false;   // give up ownership
    Cleanup(nd->back);   // bump down counters and
                         // remove nodes if necessary
}
set of values Collect( ) {
    S = emptyset; // no values so far
    nd = Head; // start at first node
    while (nd) { // search through all nodes
        v = nd->val; // get value
        if (v.valid) // if it's a valid value,
            S = S union {(nd, v.value)};
            // add it to the set
        prev = nd; // remember last node for cleanup
        nd = BumpUpOrInstall(&nd->forward,(0,null));
        // get next (if any) and bump counter
    }
    Cleanup(prev->back); // follow back pointers
                         // and cleanup
    return S; // return set of value collected.
}
void Cleanup(nd) {
    node type *removed;
    while (nd) {
        removed = BumpDownOrRemove(&nd->forward);
        // bump down outgoing counter,
        // remove pointer if it becomes zero
        if (removed != null)
            delete removed; // nobody is accessing
                            // the node; delete it
        nd = nd->back; // go to previous node, if any
    }
}
```

As before, one node is assumed to be allocated at initialization time to contain (null, false, (?, false), (0, null)). The address of this node is known to all processes. Call it Head.

As in Algorithm 1, the Store operation is implemented as a single store. In a system that provides only CAS to atomically update the forward pointers and their associated hold counts, we can guarantee only lock-freedom for the other operations: an operation may be prevented from making progress by a series of other operations continually modifying the pointer and hold count it is trying to update. However, if the BumpUpOrInstall and BumpDownorRemove operations are atomic, then all the operations are wait-free. As before, the time complexity of the Register operation is bounded by a function of the maximum activity level during its execution, and the time complexity of the Deregister operation is bounded by a function of the maximum activity level during the execution of its corresponding Register operation. The Collect operation takes time proportional to the number of nodes in the list, which is bounded by the historical maximum activity level, but, as mentioned above, may be lower. In particular, when the last node in the list is deregistered, it will be removed from the list and freed by the Cleanup procedure invoked by Deregister unless some other process is in the midst of a Register or Collect operation and has incremented the hold count of the next-to-last node. If this other process is registering a node, then the activity level of the object was high at some time during the execution of its Register operation. However, a Collect operation may prevent the last node from being removed from the list and then before it invokes Cleanup and removes and frees the last node, another Collect operation may begin and read all the way down the list, again preventing the last node from being removed. This scenario can be repeated, so a series of overlapping Collect operations can indefinitely prevent any nodes from being freed. Thus, unless there is a point at which no Collect operation is executing, we cannot guarantee that space consumption of the collect object will decrease.

We can eliminate the problem of overlapping Collect operations preventing unclaimed nodes at the end of the list from being cleaned up by separating out the hold count into the contribution by Register operations and the contribution by Collect operations. In the modified algorithm, a Collect operation detects the situation in which the contribution due to Register operations to the hold count it is accessing is 0. In this case, it does not go further down the list because there are no registered addresses further down the list. Therefore, this Collect operation does not increment subsequent hold counts in the list, so the scenario outlined earlier cannot occur. Note that these changes imply straightforward modifications to the BumpDownOrRemove and BumpUpOrInstall operations. A variety of encodings are possible to separately maintain counter contributions for Collect and non-Collect operations.

If Algorithm 2 is revised as described above, and the BumpDownOrRemove and BumpUpOrInstall operations are atomic, then the time complexity of the Collect operation is bounded by a function of the maximum activity level at any time during its execution or the execution of any Register operation that overlaps the Collect operation's execution or returns an address that is still registered during the Collect operation's execution. This also bounds the space consumption.

Optimizations and Generalizations

In the algorithms presented above, each node contains one location for a process to claim. For some applications, performance may be improved by generalizing the algorithm so that each node contains an array consisting of some constant number of such locations (perhaps enough that one node fills one cache line); such generalizations are straightforward for one skilled in the art. Also, for simplicity, in the code we have presented, every Register operation allocates a node and then frees it if the node was not needed. Those skilled in the art can easily avoid allocating the node unless the end of the list is reached, so that in practice, a node is rarely allocated without being installed into the list. Finally, while we have presented our algorithms in terms of the CAS instruction, it is straightforward to implement them using some other hardware synchronization primitives, for example the load-linked/store-conditional instruction pair.

Figure 2:
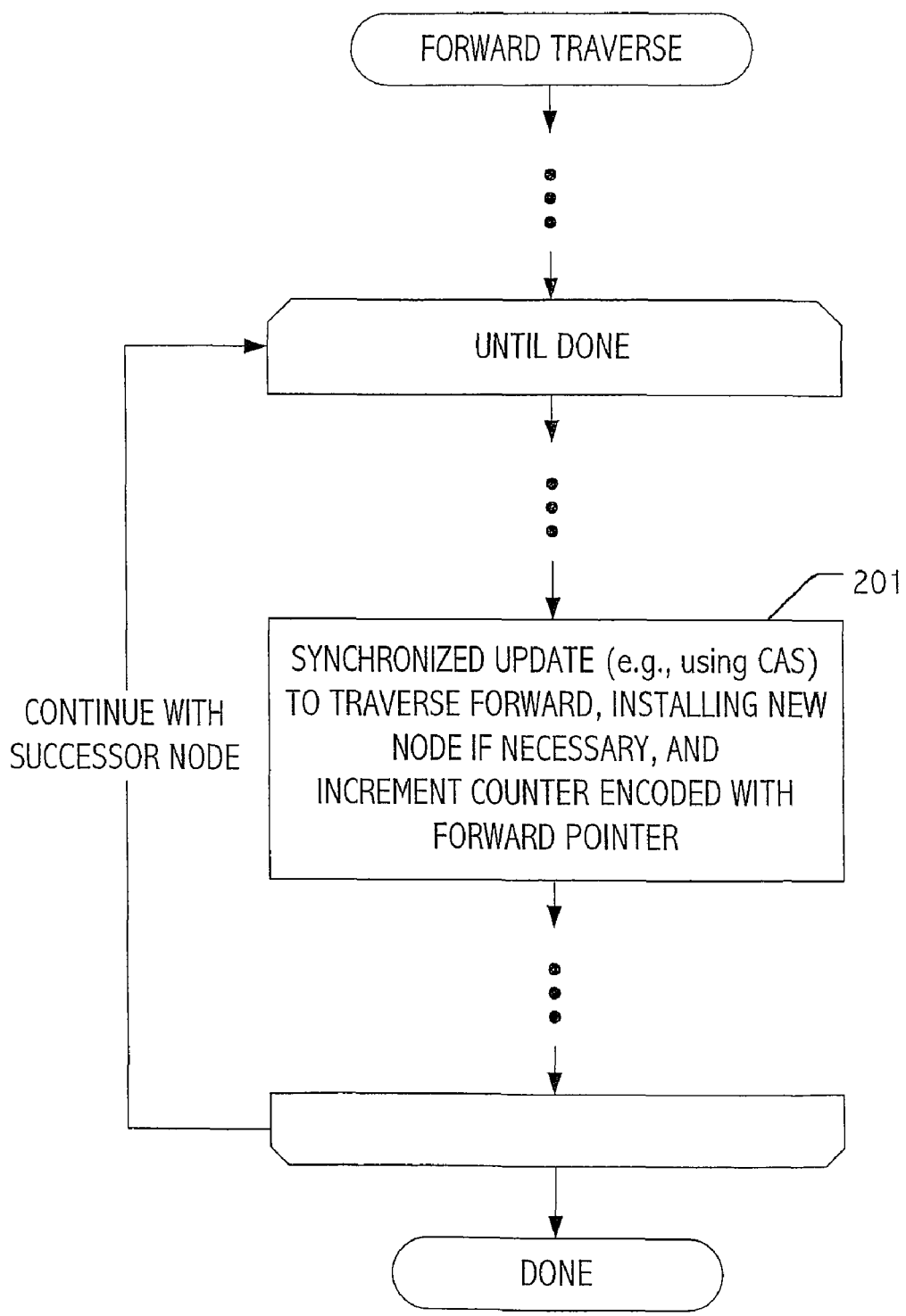
FIG. 2 depicts a general flow for a forward-direction traverse operation in accordance with some embodiments of the present invention.
Figure 3:
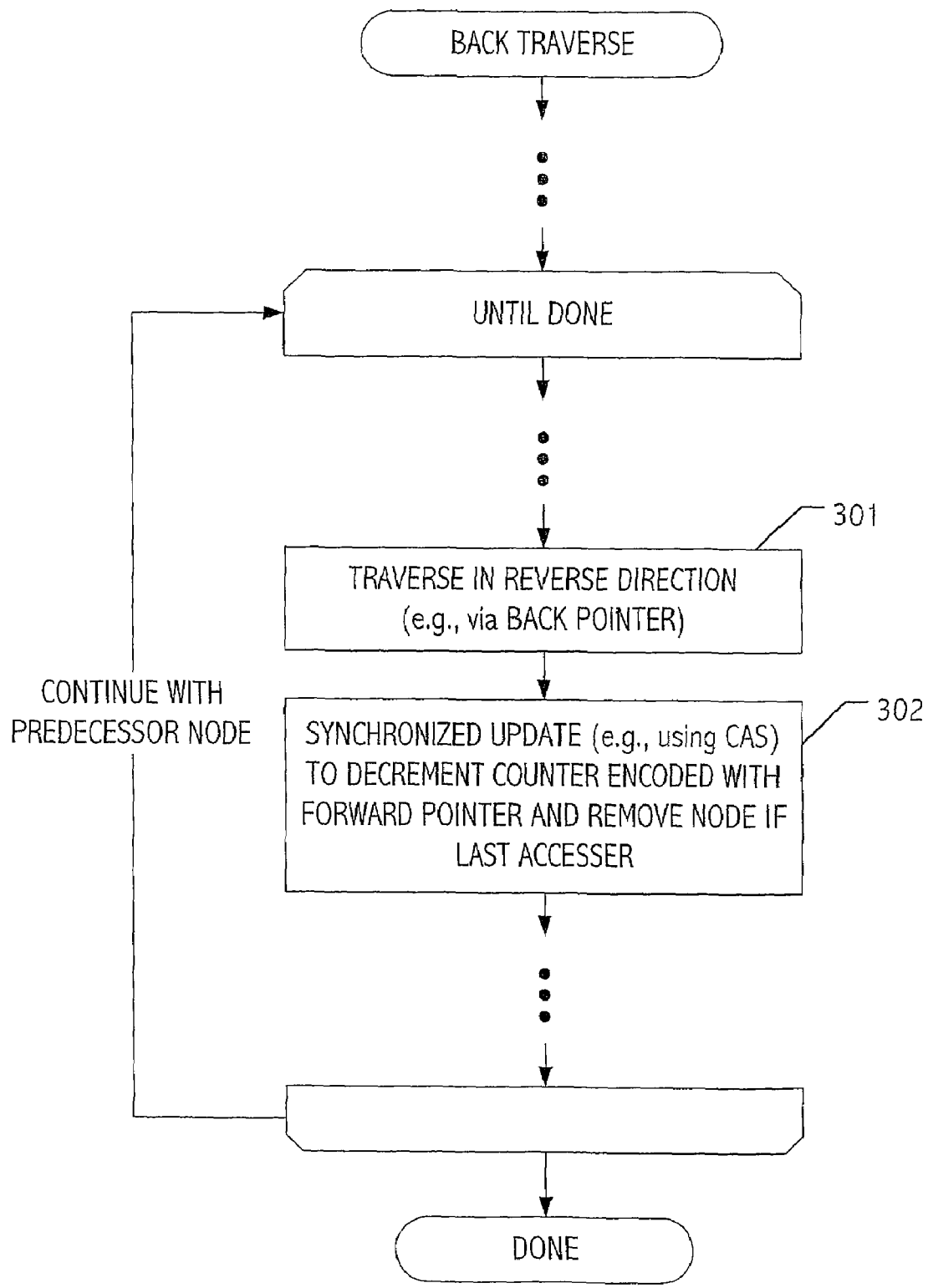
FIG. 3 depicts a general flow for a reverse-direction traverse operation in accordance with some embodiments of the present invention.

While aspects of our technique have been described with specificity in the illustrative context of the Collect problem, FIGS. 2 and 3 illustrate a generalization of one aspect of these techniques. In particular, FIG. 2 illustrates a general flow for a forward-direction traverse operation. In the exemplary Collect solution described above, Register and Collect operations both exhibited forward-direction traversal and (amongst other things specific to semantics of the Collect problem) performed a synchronized update 201 (using an atomic BumpUpOrInstall or lock-free CAS-based implementation thereof) of a forward node pointer (installing a new node, if necessary) and a hold count encoded therewith.

Correspondingly, and as illustrated in general flow for a reverse direction traverse operation (FIG. 3), a synchronized decrement and remove (if necessary) is performed for reverse direction traversals. In the exemplary Collect solution described above, Deregister and Collect operations (through operation of Cleanup) both exhibited reverse-direction traversal and (amongst other things specific to semantics of the Collect problem) performed a synchronized update 302 (using an atomic BumpDownOrRemove or lock-free CAS-based implementation thereof) of a forward node pointer (removing a trailing node, if necessary) and a hold count encoded therewith. Note that despite the reverse direction traversal, the hold count updated is that associated with (e.g., encoded integrally with) a forward node pointer.

More generally, other exploitations of the techniques described herein may employ the techniques illustrated in FIGS. 2 and 3 to provide nonblocking algorithms that do not require advance knowledge of the number of processes that participate, that have both time complexity and space consumption that adapt to various measures rather than being based on predefined worst-case scenarios, and that cannot be prevented from future memory reclamation by process failures. It is interesting to note that the "hold count" technique is not limited to lists; it can be applied to any structure in which each node has an in-degree of at most 1, and its predecessor (if any) can be found from the node. Accordingly, algorithms that employ other structures that exhibit appropriate predecessor successor relations, e.g., trees, may benefit from the illustrated techniques. In the section that follows, we summarize some additional applications of the techniques described herein.

Other Embodiments

Solutions to the Collect problem are used as building blocks in many applications in concurrent computing, and thus Collect solutions with improved properties can, in turn, directly improve properties of such applications. We do not discuss such applications further. Instead, in this section, we discuss two applications of the techniques used in our algorithms; it is straightforward to see in each case how our algorithms can be adapted for these purposes.

Memory Management for Non-blocking Data Structures

Our first application is one that originally encouraged us to work on this problem, namely memory management for non-blocking dynamic-sized shared data structures. In our previous work in this area, we proposed a Value Recycling Solution which may also be understood in the context of a Repeat Offender Problem that we posed and solved. Here we briefly discuss only those details of this problem and our solution that are significant to our current description. Additional details (including formal descriptions both Value Recycling and the Repeat Offender Problem) may be found in the above-incorporated, commonly owned, co-pending U.S. patent application Ser. No. 10/340,156, filed Jan. 10, 2003, naming Mark S. Moir, Victor Luchangco and Maurice Herlihy as inventors.

To summarize, the Repeat Offender Problem requires processes to be able to dynamically acquire and release locations, to be able to store values in these locations, and to be able to iterate over all values that have been stored in locations that have not subsequently been released. In the parlance, processes "hire" and "fire" "guards", "post" guards on "values", and determine which values are guarded in order to "liberate" those that are not. In the solutions described, we simplified the presentation by assuming that we know in advance an upper bound on the number of guards simultaneously employed, and allocating space for this number of guards as an array. This makes it straightforward to hire and fire guards: hiring is achieved by attempting to atomically claim each one in order until success. While this is simple, it does cause some limitations. In particular, we estimate the number of guards conservatively to ensure that we allocate enough. As a result, for example, our dynamic-sized lock-free FIFO queue implementation, which we achieved by applying our solution to the population-oblivious algorithm of Michael and Scott, is population-aware.

However, the algorithms presented herein can be used to overcome the above-described shortcoming of the simplified presentation of our ROP solution. In particular, Register can be used to implement the HireGuard operation, Deregister can be used to implement the FireGuard operation, Store can be used to implement the PostGuard operation, and Collect can be easily adapted to implement the functionality of the Liberate operation presented in the above-incorporated, commonly owned, co-pending U.S. patent application Ser. No. 10/340,156, filed Jan. 10, 2003, naming Mark S. Moir, Victor Luchangco and Maurice Herlihy as inventors.

The resulting ROP solutions have properties corresponding to those for the particular Collect solution used. As a result, we believe that using the ROP solution achieved by applying Algorithm 2 as described above results in the first population-oblivious, space-adaptive implementation of a lock-free object that cannot be prevented from future memory reclamation by process failures.

Long-Lived Renaming

Solutions to the Collect problem have been used in various solutions to the renaming problem. However, such renaming solutions are complicated, expensive, and population-aware, and are not space-adaptive. The techniques presented in this paper can be adapted to solve the renaming problem much more efficiently, and in a space-adaptive, population-oblivious manner. The reason is that, in our algorithms, nodes are added at the end of the list, and a node is not removed from the list while it still has successor nodes. Thus, we can solve the renaming problem simply by counting the number of iterations of the main loop of Register in order to determine the number of nodes before the node eventually claimed, and taking this number as a name. With this approach, the renaming solution inherits all of the properties of the particular Collect solution that is adapted. Note that no Collect operation is required for this application, so Algorithm 2 suffices without the modifications described above to eliminate problems associated with overlapping Collects. The results is the first population-oblivious, space-adaptive, nonblocking, renaming solution.

Additional Thoughts

We have presented simple techniques based on widely available hardware synchronization primitives for designing nonblocking algorithms that do not require advance knowledge of the number of processes that participate, that have both time complexity and space consumption that adapt to various measures rather than being based on predefined worst-case scenarios, and that cannot be prevented from future memory reclamation by process failures. We have presented these techniques in the context of various solutions to the Collect problem and have also described how these same techniques can be applied to achieve new algorithms with similar properties for solving the renaming problem, and for supporting memory management in dynamic-sized lock-free data structures.

While the invention(s) has (have) been described with reference to various embodiments, it will be understood that these embodiments are illustrative and that the scope of the invention(s) is not limited to them. Many variations, modifications, additions, and improvements are possible. For example, while application to particular nonblocking algorithms and particular implementations thereof have been described in detail herein, applications to other algorithms, and other implementing data structures will also be appreciated by persons of ordinary skill in the art. In addition, more complex implementations may be defined, which exploit the techniques described herein. Other synchronization primitives may be employed. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

Terms such as always, never, all, none, etc. are used herein to describe sets of consistent states presented by a given computational system, particularly in the context of correctness proofs or discussions. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A non-transitory, computer readable storage medium, storing program code executable on one or more processors to instantiate a dynamically sizable data structure;
   wherein accesses to the shared data structure are lock-free;
   wherein instantiation of the shared data structure does not require a known bound on the number of processes that will ever access the shared data structure;
   wherein the amount of storage consumed by the shared data structure is adaptive independent of any historical maximum value associated with the shared data structure; and
   wherein failure of a thread that accesses the shared data structure does not prevent all future reclamation of the storage consumed by the shared data structure by a non-failed thread;
   wherein the adaptivity of the amount of storage consumed by the shared data structure is achieved through explicit reclamation and without resorting to garbage collection.

2. The storage medium of claim 1, wherein the shared data structure is employed in the implementation of a garbage collector.

3. The storage medium of claim 1, wherein concurrent operations on the shared data structure are mediated using only single-target synchronization primitives.

4. The storage medium of claim 3, wherein the single-target synchronization primitives comprise one or more Compare-And-Swap (CAS) operations.

5. The storage medium of claim 3, wherein the single-target synchronization primitives comprise one or more Load-Linked (LL) and Store-Conditional (SC) operation pairs.

6. The storage medium of claim 1,
wherein the adaptivity includes adaptivity as a function of size of the shared data structure; and
wherein the independence includes independence at least of a historical maximum data structure size.

7. The storage medium of claim 1,
wherein the adaptivity includes adaptivity as a function of a number of processes that concurrently access the shared data structure; and
wherein the independence includes independence at least of a historical maximum number of processes that concurrently access the shared data structure.

8. The storage medium of claim 1, wherein time complexity of operations on the shared data structure is also adaptive.

9. The storage medium of claim 1,
wherein the shared data structure includes a plurality of nodes organized with predecessor and successor relations thereamongst;
wherein the in-degree of each one of the nodes is at most one (1); and
wherein an immediate predecessor of one of the nodes can be identified from information stored in the one of the nodes.

10. The storage medium of claim 1, wherein the shared data structure includes a plurality of nodes organized as a list.

11. The storage medium of claim 1, wherein the shared data structure includes a plurality of nodes organized as a hierarchy.

12. An apparatus, comprising:
one or more processors for executing respective threads of a computation;
shared storage accessible by the one or more processors; and
means for instantiating in the shared storage a dynamically-sizable shared data structure that is accessible by two or more executing threads;
wherein accesses to the shared data structure are lock-free;
wherein said instantiating the shared data structure does not require a known bound on the number of processes that will ever access the shared data structure;
wherein the amount of storage consumed by the shared data structure is adaptive independent of any historical maximum value associated with the shared data structure;
wherein failure of any one of the executing threads to which the shared data structure is accessible does not prevent all future reclamation of the storage consumed by the shared data structure by a non-failed one of the threads; and
wherein the adaptivity of the amount of storage consumed by the shared data structure is achieved through explicit reclamation and without resorting to garbage collection.

* * * * *